(12) United States Patent  
Torii

(10) Patent No.: US 7,934,748 B2
(45) Date of Patent: May 3, 2011

(54) PILLAR GARNISH MOUNTING STRUCTURE FOR A VEHICLE EQUIPPED WITH A HEAD-PROTECTING AIR BAG APPARATUS

(75) Inventor: Nobuyuki Torii, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 96 days.

(21) Appl. No.: 12/300,562

(22) PCT Filed: Sep. 4, 2007

(86) PCT No.: PCT/IB2007/002551
§ 371 (c)(1),
(2), (4) Date: Nov. 12, 2008

(87) PCT Pub. No.: WO2008/029253
PCT Pub. Date: Mar. 13, 2008

(65) Prior Publication Data
US 2009/0160165 A1    Jun. 25, 2009

(30) Foreign Application Priority Data

Sep. 6, 2006 (JP) ................................. 2006-241770

(51) Int. Cl.
*B60R 21/213* (2011.01)
(52) U.S. Cl. .................. 280/730.2; 280/728.3
(58) Field of Classification Search ............... 280/730.2, 280/728.3
See application file for complete search history.

(56) References Cited

U.S. PATENT DOCUMENTS

| 6,254,123 B1 | 7/2001 | Urushi et al. | |
| 6,305,707 B1 * | 10/2001 | Ishiyama et al. | ............ 280/728.2 |
| 6,530,594 B1 | 3/2003 | Nakajima et al. | |
| 7,134,682 B2 * | 11/2006 | Totsuka et al. | ............. 280/728.2 |
| 7,172,211 B2 * | 2/2007 | Hirose | ........................ 280/730.2 |

(Continued)

FOREIGN PATENT DOCUMENTS

EP    0 980 795 A2    2/2000
(Continued)

OTHER PUBLICATIONS

Excerpt from "Notification of Reason(s) for Refusal" in Japanese Patent Application No. 2006-241770, filed Sep. 6, 2006.

*Primary Examiner* — Paul N Dickson
*Assistant Examiner* — Drew Brown
(74) *Attorney, Agent, or Firm* — Finnegan, Henderson, Farabow, Garrett & Dunner, LLP

(57) ABSTRACT

A metal bracket (50) is mounted on the outside surface that faces outside of the passenger compartment in the lateral direction of the vehicle of an upper end (46C) of a center pillar garnish (36). When an air bag (20) is deployed, bent parts (74B) of the wings of the bracket (50) come into contact with a seat part (88) of a pillar inner panel (38) and the a portion of the expansion force is transferred. As the air bag (20) continues to expand, the bracket (50) rotates about the base of an upper inclined part (72C), and the bent parts 74B rotate toward the outside in the vehicle width direction. Because the lower edges (74C) of the wings (74) come into contact with the pillar inner panel (38), the expansion force is transferred to the pillar inner panel 38.

23 Claims, 8 Drawing Sheets

U.S. PATENT DOCUMENTS

| | | | |
|---|---|---|---|
| 7,182,366 B2 * | 2/2007 | Enriquez | 280/730.2 |
| 7,607,684 B2 * | 10/2009 | Downey et al. | 280/730.2 |
| 2005/0236818 A1 | 10/2005 | Hirose | |
| 2005/0253366 A1 * | 11/2005 | Uno et al. | 280/730.2 |
| 2006/0043703 A1 * | 3/2006 | Enriquez | 280/730.2 |
| 2006/0082108 A1 * | 4/2006 | Wahara et al. | 280/730.2 |

FOREIGN PATENT DOCUMENTS

| | | |
|---|---|---|
| JP | 10-138858 | 5/1998 |
| JP | 3125729 | 11/2000 |
| JP | 2001-97171 | 4/2001 |
| JP | 2002-59802 | 2/2002 |
| JP | 3298567 | 4/2002 |
| JP | 2002-178870 | 6/2002 |
| JP | 2003-63347 | 3/2003 |
| JP | 2003-276550 | 10/2003 |
| JP | 2003-291771 | 10/2003 |
| JP | 3481473 | 10/2003 |
| JP | 2004-182144 | 7/2004 |
| JP | 2004-210090 | 7/2004 |
| JP | 2004-231133 | 8/2004 |
| JP | 2005-313674 | 11/2005 |

* cited by examiner

PILLAR GARNISH MOUNTING STRUCTURE FOR A VEHICLE EQUIPPED WITH A HEAD-PROTECTING AIR BAG APPARATUS

CROSS-REFERENCE TO RELATED APPLICATIONS

This application is a national phase application of International Application No. PCT/IB2007/002551, filed Sep. 4, 2007, and claims the priority of Japanese Application No. 2006-241770, filed Sep. 6, 2006, the contents of both of which are incorporated herein by reference.

BACKGROUND OF THE INVENTION

1. Field of the Invention

The present invention relates to an improved pillar garnish mounting structure in a vehicle equipped with a head-protecting air bag apparatus.

2. Description of the Related Art

Head-protecting air bag apparatuses, which deploy downward from under the roof side rail, like a curtain, in a side impact or rollover, have come into use in vehicles as auxiliary occupant protecting devices.

Japanese Patent No. 3125729 ("JP-B2-3125729") describes this type of head-protecting air bag apparatus. In the head-protecting air bag apparatus described in JP-B2-3125729, a jump-up stand is integrally formed with the upper edge of the outer surface of the center pillar garnish, and the air bag is prevented from getting caught on the upper end part of the center pillar garnish when the air bag is deployed.

The Japanese Patent Application Publication No. JP-A-2003-63347 ("JP-A-2003-63347") describes a head-protecting air bag apparatus of the same type as the JP-3125729. The difference in this air bag apparatus is that the end of the jump-up stand (extended guide) provided at the upper end of the center pillar garnish is received by the stopper (seat) formed in the center pillar inner panel, thereby preventing damage to the jump-up stand.

The structures of the jump-up stands described in JP-A-2003-63347 and the JP-3125729 are useful. In a head-protecting air bag apparatus provided between the front to the rear seat, however, because the inflator is often disposed near the center of the upper end of the center pillar and that the gas supplied from the inflator is increased, thus, increased deploying pressure may be applied to the upper end of the center pillar garnish, which may damage the jump-up stand.

SUMMARY OF THE INVENTION

The present invention provides a pillar garnish mounting structure in a vehicle equipped with a head-protecting air bag apparatus, which effectively reduces the possibility of damage to deployment direction guide (a jump-up stand), which restricts the deployment direction of an air bag provided at the upper end of the garnish.

A first aspect of the present invention is a pillar garnish mounting structure in a vehicle equipped with a head-protecting air bag apparatus having an inflator, which is disposed at a prescribed position in the vehicle, and an air bag, at least a part of which is housed in a folded condition between a roof side rail and a headliner end part, which expands and deploys from below the roof side rail into the passenger compartment by pressing open the headliner end part when gas is supplied from the inflator. The pillar garnish mounting structure has a deployment direction guide integrally formed in a outside surface that faces outside of the passenger compartment in the lateral direction of the vehicle at an upper edge of a front part of a pillar garnish affixed to the inside surface that faces the passenger compartment in the lateral direction of the vehicle of a pillar inner panel, and a guide wall inclined toward the passenger compartment that guides the air bag toward the passenger compartment as it deploys; and a metal bracket provided on an outside surface that faces outside of the passenger compartment in the lateral direction of the vehicle of the deployment direction guide, which comes into surface contact with a seat part formed on the pillar inner panel and protrudes toward the guide wall when the expansion force of the air bag is applied to the guide wall. At least one part of the upper edge of the front part overlaps with the headliner end part surface inside of the passenger compartment.

According to this aspect, when the inflator supplies gas to the air bag, the air bag expands into the passenger compartment by pushing open the end part of the headliner. When this occurs, because part of the edge of the front part of the pillar garnish overlaps with the end of the headliner, the upper end of the front part of the pillar garnish is also pressed into the passenger compartment and flexed. However, because the inclined guide wall, which is inclined downward toward the passenger compartment, is formed integrally in the outer surface of the upper end of the front part of the pillar garnish, the air bag is guided by the guide wall and the deployment direction thereof is restricted. As a result, the air bag smoothly deploys like a curtain in the passenger compartment downward from the roof side rail to protect the heads of the occupants.

A metal bracket is provided on the outer surface of the deployment direction guide. When the expansion force of the air bag is applied to the guide wall, the bracket comes into surface contact with the guide wall formed on the pillar inner panel. As a result, part of the expansion force received by the deployment direction guide from the air bag and, by extension, received by the upper edge of the front part of the pillar garnish, is transferred to the pillar inner panel side via the metal bracket. The load transferred to the upper end of the pillar garnish in particular is therefore commensurately reduced, and the load applied to the deployment direction guide of the pillar garnish is therefore reduced.

According to the foregoing aspect of the present invention effectively reduces the possibility of damage to the deployment direction guide provided on the end of the garnish, which restricts the deployment direction of the air bag.

In the foregoing aspect, an upper end of the bracket may extend both upwards and laterally outward, and may pass through an aperture formed in the pillar inner panel, and further engages and overlaps with an outside of the passenger compartment in the lateral direction of the vehicle of the pillar inner panel.

According to the foregoing aspect, when the upper edge of the front part of the pillar garnish flexes inside of the passenger compartment due to the expansion force of the airbag, the upper end of the bracket mates with the aperture of the pillar inner panel, and a part of the expansion force is transmitted from the mating location to the pillar inner panel. The input load to the deployment direction guide and, by extension, to the upper end of the pillar garnish is, therefore, further reduced.

According to the foregoing aspect even more effectively suppresses damage to the deployment direction guide and, by extension, to the pillar garnish upper end.

A second aspect of the present invention is a pillar garnish mounting structure that may be employed in a vehicle equipped with a head-protecting air bag apparatus having an inflator, which is disposed at a prescribed position in the vehicle, and an air bag, at least a part of which is housed in a folded condition between a roof side rail and a headliner end part expands and deploys from below the roof side rail when gas is supplied form the inflator, pressing the headliner end part to open it into the passenger compartment. The foregoing pillar garnish mounting structure has: a deployment direction guide integrally formed in an outside of the passenger compartment in the lateral direction of the vehicle at an upper edge of a front part of a pillar garnish affixed to the inside of a pillar inner panel, and a guide wall inclined toward the passenger compartment that guides the air bag toward the passenger compartment as it deploys; and a metal bracket provided on an outside of the passenger compartment in the lateral direction of the vehicle of the deployment direction guide, the lower part of which comes into contact with the pillar inner panel when the expansion force of the air bag is applied to the guide wall, and the upper edge of a front part of the pillar garnish flexes inside of the passenger compartment. The upper end of the bracket extends both upwards and laterally outwards, and passes through an aperture formed in the pillar inner panel, and further engages and overlaps with an outside of the passenger compartment in the lateral direction of the vehicle of the pillar inner panel. In this aspect, at least one part of the front part overlaps with the headliner end part surface inside of the passenger compartment.

According to the second aspect of the present invention, when the inflator, disposed at a prescribed position in the vehicle, supplies gas to the air bag, the air bag expands into the passenger compartment by pushing open the end of the headliner. When this occurs in the present invention, the edge of the front part of the pillar garnish is disposed so as to partially overlap with the headliner. For this reason, the upper end is also pressed into the passenger compartment and attempts to deform. However, because the deployment direction guide that has the inclined guide wall that is inclined downward toward the inside of passenger compartment is formed integrally on the outer surface of the upper end, the air bag is guided by the guide wall and the deploying direction thereof is restricted. As a result, the air bag smoothly deploys like a curtain in the passenger compartment downward from the roof side rail, and the heads of occupants are protected by the air bag.

Also, a metal bracket may be provided on the outer surface of the deployment direction guide, the upper end of the bracket extends both upward and laterally outward, passing through the aperture formed in the pillar inner panel, and engages and overlaps with an outside surface of the pillar inner panel. As a result, when air bag expansion force is applied to the guide wall, it attempts to rotate the bracket to the outside in the vehicle width direction. The rotational force rotates the bracket laterally outwards about the upper end. The lower part of the bracket comes into contact with the pillar inner panel. For this reason, a part of the expansion force received from the air bag by the deployment direction guide and, by extension, by the pillar garnish upper end is transferred via the bracket to the pillar inner panel. In particular, the load that is transferred to the upper end side of the center, pillar garnish is therefore commensurately reduced, thereby reducing the load applied to the upper end, and enabling a reduction in the of the load imparted to the deployment direction guide of the pillar garnish.

According to the foregoing aspect effectively reduces the possibility of damage to the deployment direction guide provided at the garnish upper end.

In the foregoing aspect, the deploying direction guide may further have a vertical wall that extends upward to the inside edge of the guide wall and that may be substantially parallel with the front part and a mating part that may extend upward from the outside edge of the guide wall.

In the foregoing aspect, wherein the guide wall may extend upward from the upper edge of the vertical wall, and the mating part may extend upward from the guide wall such that the mating part may be inclined with respect to a horizontal direction at a larger angle than an angle at which the guide wall is inclined with respect to the horizontal direction.

In the foregoing aspect, a trapezoidally shaped rib may be formed on the inside surface that faces the passenger compartment in the lateral direction of the vehicle of the base part of the deployment direction guide, the long side of the trapezoidally shaped rib may be connected to the vertical wall, the short side may be connected to the upper edge, and the lower side of which may be connected to a channel base, which links the upper edge and the vertical wall.

In the foregoing aspect, on the outside of the deployment direction guide, a plurality of longitudinal ribs that bridge across the vertical wall and the guide wall and a lateral rib that intersects with the longitudinal ribs may be provided, the lateral rib mutually connecting the plurality of longitudinal ribs.

In the foregoing aspect, a central rib that bridges across the vertical wall and the guide wall may be provided on the outside surface of the center part of the deployment direction guide in the vehicle width direction. The central rib has a thickness greater than that of the longitudinal ribs and extends further outward laterally than the longitudinal ribs.

In the foregoing aspect, the bracket may include a central support bent to coincide with the shape of the deployment direction guide, and a pair of wings extending outward on the right and left from the bottom edge of the central support.

In the foregoing aspect, when the upper edge of the front part flexes into the passenger compartment, the lower edges of the wings may come into contact with the pillar inner panel.

In the foregoing aspect, a slit may be provided in the center part of the central support of the bracket in the longitudinal direction of the vehicle, the bracket coming into contact with the longitudinal ribs and the mating part, and the central rib being inserted in the slit.

In the foregoing aspect a sound-absorbing material may be provided at the upper end of the wings.

In the foregoing aspect, the air bag may have a front chamber that expands at the side of the front seat occupant's head, and a rear chamber that expands at the side of the rear seat occupant's head, wherein the inflator is disposed in the vicinity of the upper end of the pillar garnish in the roof side rail.

According to the foregoing aspect, because the inflator is disposed near the upper end of the pillar garnish in the roof side rail, it may be expected that a greater force will be applied to the upper end of the pillar garnish when the high-pressure gas is discharged from the inflator.

However, because the metal bracket is provided on the deployment direction guide that are integrally provided on the upper end, even if a high load is imparted, it is possible to efficiently allow the load to escape to the pillar inner panel.

This aspect effectively prevents damage to the upper end of the pillar garnish even if the air bag is disposed at the center of the roof side rail or if the output of the inflator is increased.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF THE PREFERRED EMBODIMENTS

Figure 1:
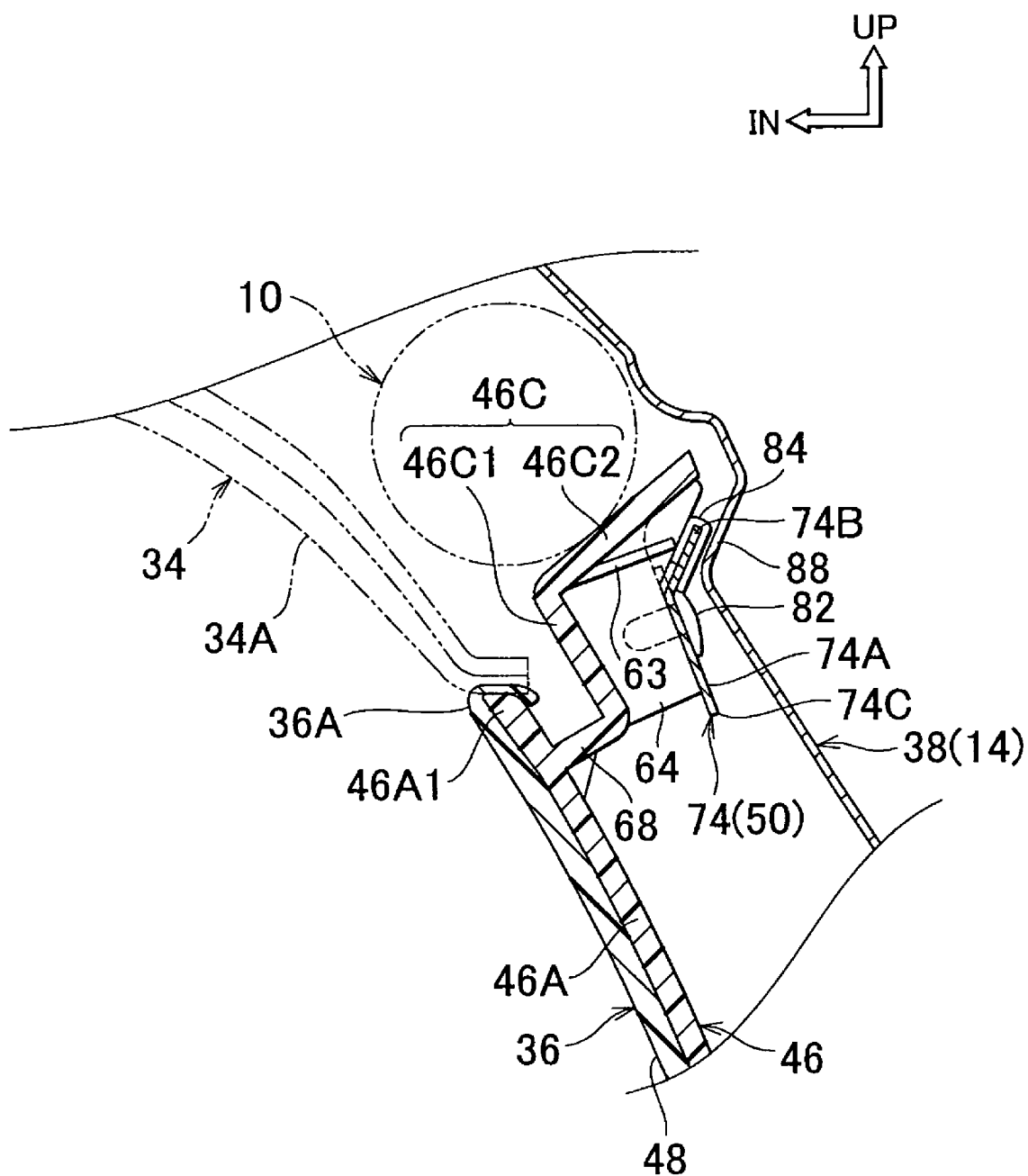
FIG. 1 shows a pillar garnish mounting structure in a vehicle equipped with a head-protecting air bag apparatus according to an embodiment of the present invention, in the form of an enlarged partial cross-sectional view along the line I-I shown in FIG. 4.

An embodiment of a center pillar garnish mounting structure in a vehicle equipped with a head-protecting air bag apparatus according to the present invention is described below, using FIG. 1 through FIG. 8. Arrows are provided in the drawing to indicate directions, the FR arrow indicating the front of the vehicle, the UP arrow indicating the upward direction of the vehicle, and the IN arrow indicating an inward direction in the lateral direction of the vehicle. In the center pillar garnish mounting structure in the invention, the "inside surface" is the face that faces the passenger compartment in the lateral direction of the vehicle, that is, the direction indicated by the arrow IN in the FIG. 1 through FIG. 3 and FIG. 5 through FIG. 8. Also, the "outside surface" is the face that is opposite to the "inside surface", and that faces outside of the passenger compartment in the lateral direction of the vehicle.

The overall configuration of the head-protecting air bag apparatus 10 is described below.

As shown in FIG. 1 through FIG. 4, the head-protecting air bag apparatus 10 includes an air bag 20 and a substantially cylindrically shaped inflator 22. The air bag 20 passes between the front pillar (A pillar) 12, the center pillar (B pillar) 14, and the quarter pillar (C pillar) 16, in a folded condition along the roof side rail 18. The inflator 22 is connected to the air bag 20 near the center part of the air bag 20 and discharges gas when a side impact or a rollover occurs.

Mounting pieces 24 are formed on the upper edge of the air bag 20 at appropriate intervals. The mounting pieces 24 are attached to a roof side rail inner (not illustrated) of the roof side rail 18, using bolts and weld nuts, to hold the air bag 20 to the body. The air bag 20 has a front chamber 20A that expands at the side of the head of a front-seat occupant, and a rear chamber 20B that expands at the side of the head of a rear-seat occupant. Additionally, the inflator 22 that expands and deploys the air bag 20 is tightened and held by a bracket to the roof side rail inner (not illustrated) of the roof side rail 18, using bolts and weld nuts. A fin-shaped connecting part 20C is integrally formed to the upper edge side in the vicinity of the center of air bag 20 in the longitudinal direction, and a gas discharge port 22A of the inflator 22 is connected to this connecting part 20C.

The inflator 22 is connected to an air bag ECU (not illustrated) disposed, for example, below a console box. The inflator 22 is electrically powered and operates to generate gas when a side impact detection sensor (not illustrated) disposed, for example, below the center pillar 14 or when a rollover detection sensor (not illustrated) disposed, for example, within the air bag ECU, detects a side impact condition or a rollover condition.

The head-protecting air bag apparatus 10 described above is covered by an end 34A of the headliner 34. That is, the end 34A of the headliner 34 bends from the general part 34B of the headliner 34 to hang down toward the bottom of the vehicle, and the air bag 20 is folded in an elongated shape and housed at the outside of the end 34A (refer to FIG. 4). When assembled, an upper end 36A (the upper edge thereof) of the center pillar garnish 36 is disposed to overlap from the inside of the passenger compartment with the edge of the end 34A.

Figure 2:
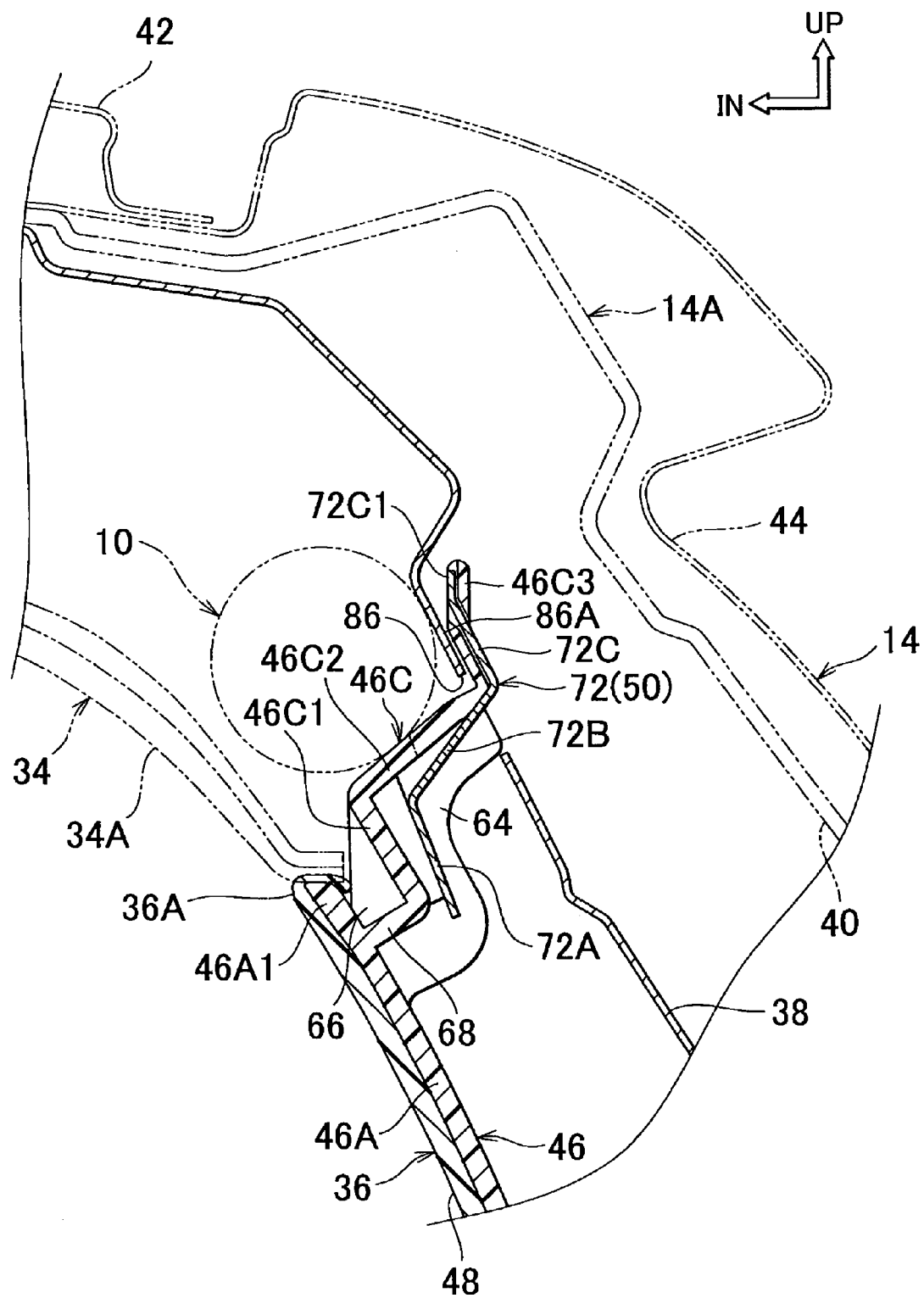
FIG. 2 shows the pillar garnish mounting structure in a vehicle equipped with a head-protecting air bag apparatus, in the form of an enlarged partial cross-sectional view along the line II-II shown in FIG. 4 according to the embodiment of the present invention.
Figure 3:
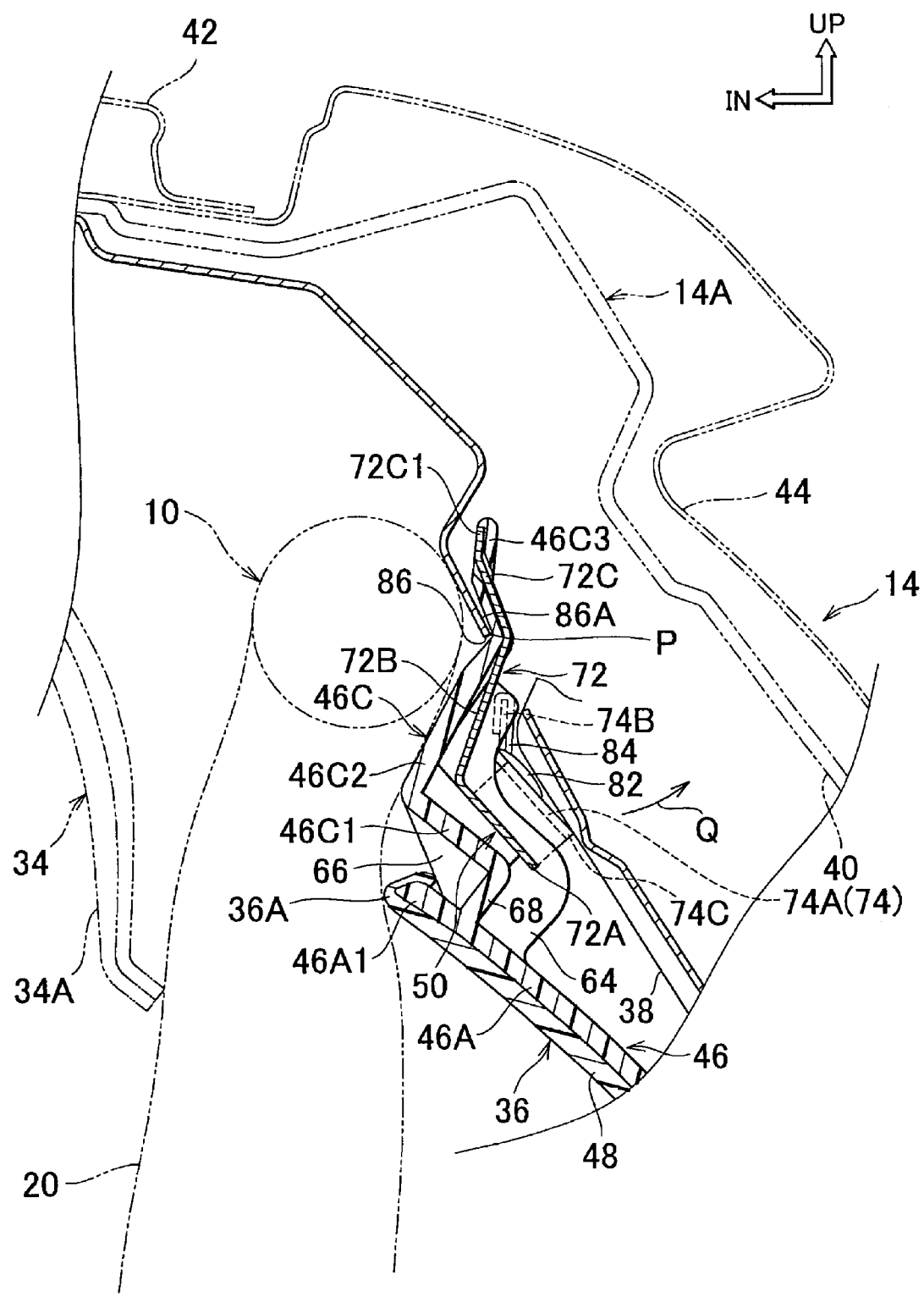
FIG. 3 is an enlarged partial cross-sectional view corresponding to FIG. 2, showing the behavior of a bracket when the air bag in the condition shown in FIG. 2 expands and deploys.
Figure 4:
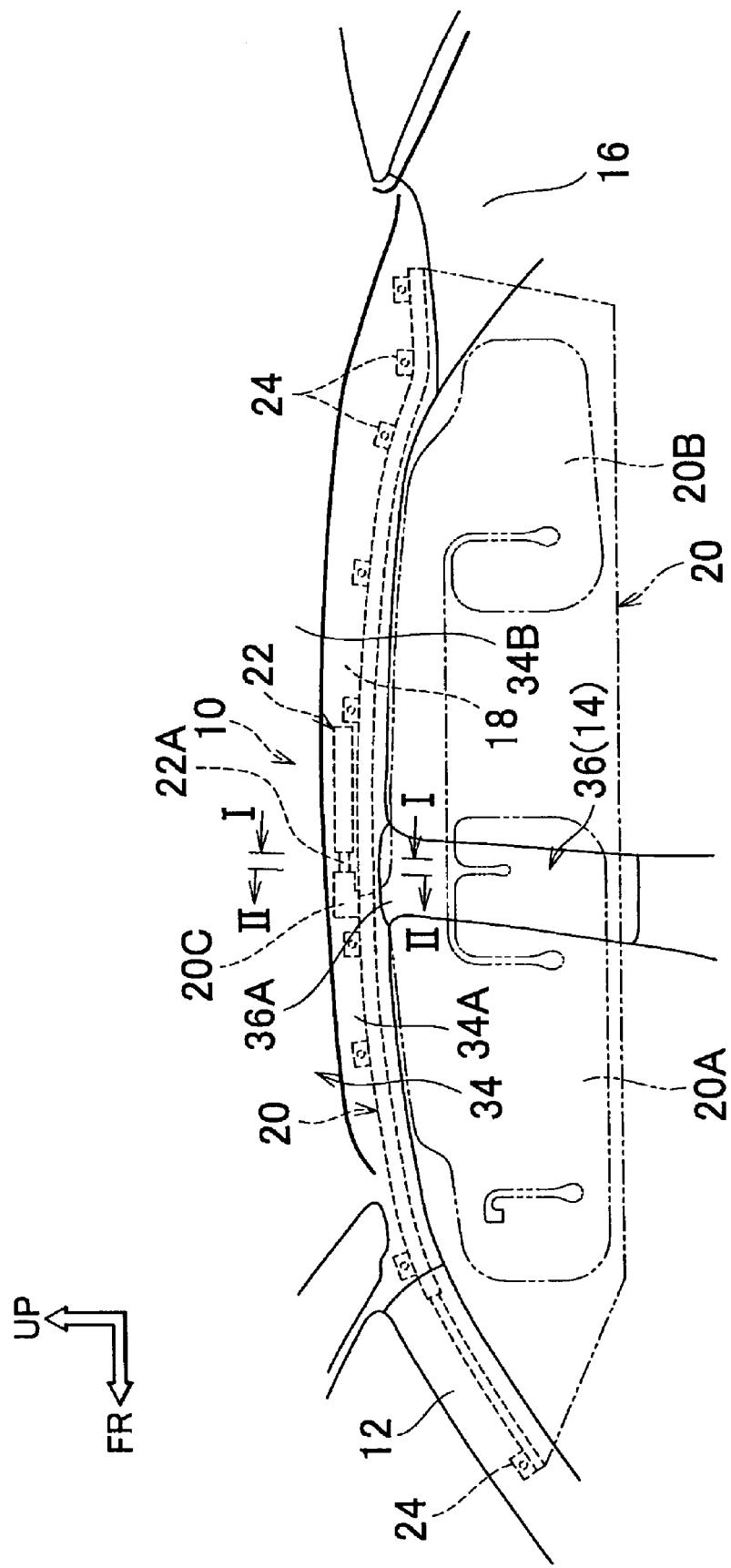
FIG. 4 is a side elevation of a vehicle in which a head-protecting air bag apparatus according to the embodiment of the present invention, seen from within the passenger compartment.

The general configuration of the center pillar 14 will now be described. As shown in FIG. 1 through FIG. 3, the center pillar 14 is provided upright in substantially the center part of the vehicle side in the longitudinal direction of the vehicle. A pillar inner panel 38, disposed inside the passenger compartment, and a pillar outer panel 40, which forms a closed cross-section with the pillar inner panel 38, are the main parts of the center pillar 14. A side outer panel 44 that is joined to a roof panel 42 at the upper end is disposed on the part of the pillar outer panel 40 outside the passenger compartment. Although not illustrated in FIG. 1 through FIG. 3, upper end 14A of the center pillar 14 is formed to be substantially T-shaped when viewed from the side of the vehicle, and is connected to the roof side rail 18. Therefore, the roof side rail 18 extends in the longitudinal direction of the vehicle at the position of the upper end 14A of the center pillar 14 shown in FIG. 1 through FIG. 3.

The overall configuration of the center pillar garnish 36 will be described. As shown in FIG. 5 through FIG. 8, the center pillar garnish 36 is affixed to the surface of the center pillar 14 facing the passenger compartment of the pillar inner panel 38. The center pillar garnish 36 includes a base 46 made of resin, an outer covering 48 that covers the surface of the base 46 inside on the passenger compartment side, and a metal bracket 50 that is attached to an upper end 46C of the base 46, to be described below.

The base 46 includes a front part 46A, that faces to the passenger compartment in the lateral direction of the vehicle, side parts 46B on either side, which are formed to bend from the both side edges of the front part 46A laterally outward, an upper end 46C that serves as a deployment direction guide, which extends from the upper edge of the front part 46A toward the outside in the inclined upper direction, and a lower edge 46D that extends downward from the lower edge of the front part 46A. The front part 46A, the plan-view shape of which is substantially U-shaped.

A plurality of lateral ribs 52 are integrally formed on the outside surface of the base 46 opposite the side parts 46B extending in the thickness direction of the side parts 46B. The lateral ribs 52 are disposed at prescribed intervals in the height direction of the base 46, and are tuned to have a prescribed stiffness. A mounting seat 56 with a mounting hole 54 formed thereon is formed in the lower edge 46D of the base 46. The mounting seat 56 contacts the surface of the pillar inner panel 38 that faces the passenger compartment (refer to FIG. 2), and the lower edge side of the center pillar garnish 36 is fixed to the pillar inner panel 38 by a resin clips (not illustrated).

The structure of the upper end 46C of the base 46 of the center pillar garnish 36 will now be described. The upper end 46C serves as the deployment direction guide of the present invention. The upper end 46C of the base 46 of the center pillar garnish 36 described above (herein referred to as the upper end 46C), is configured to include a vertical wall 46C1 that extends upward from the center pillar garnish 36 and is substantially parallel with the front part 46A, a guide wall (jump-up stand) 46C2 that extends upward from the upper end of the vertical wall 46C1 and that is inclined with a prescribed downward gradient toward the passenger compartment, and a mating part 46C3 that extends upward from the outside edge, of the guide wall 46C2 such that the mating part 46C3 is inclined with respect to a horizontal direction at a larger angle than an angle at which the guide wall 46C2 is inclined with respect to the horizontal direction. The mating part 46C3 is formed substantially Z-shaped when viewed from the side, and has formed on both sides of the base thereof a pair of slits 58 (refer to FIG. 7), and also has formed in the vicinity of the end thereof an insertion aperture 60 (refer to FIG. 7).

Figure 7:
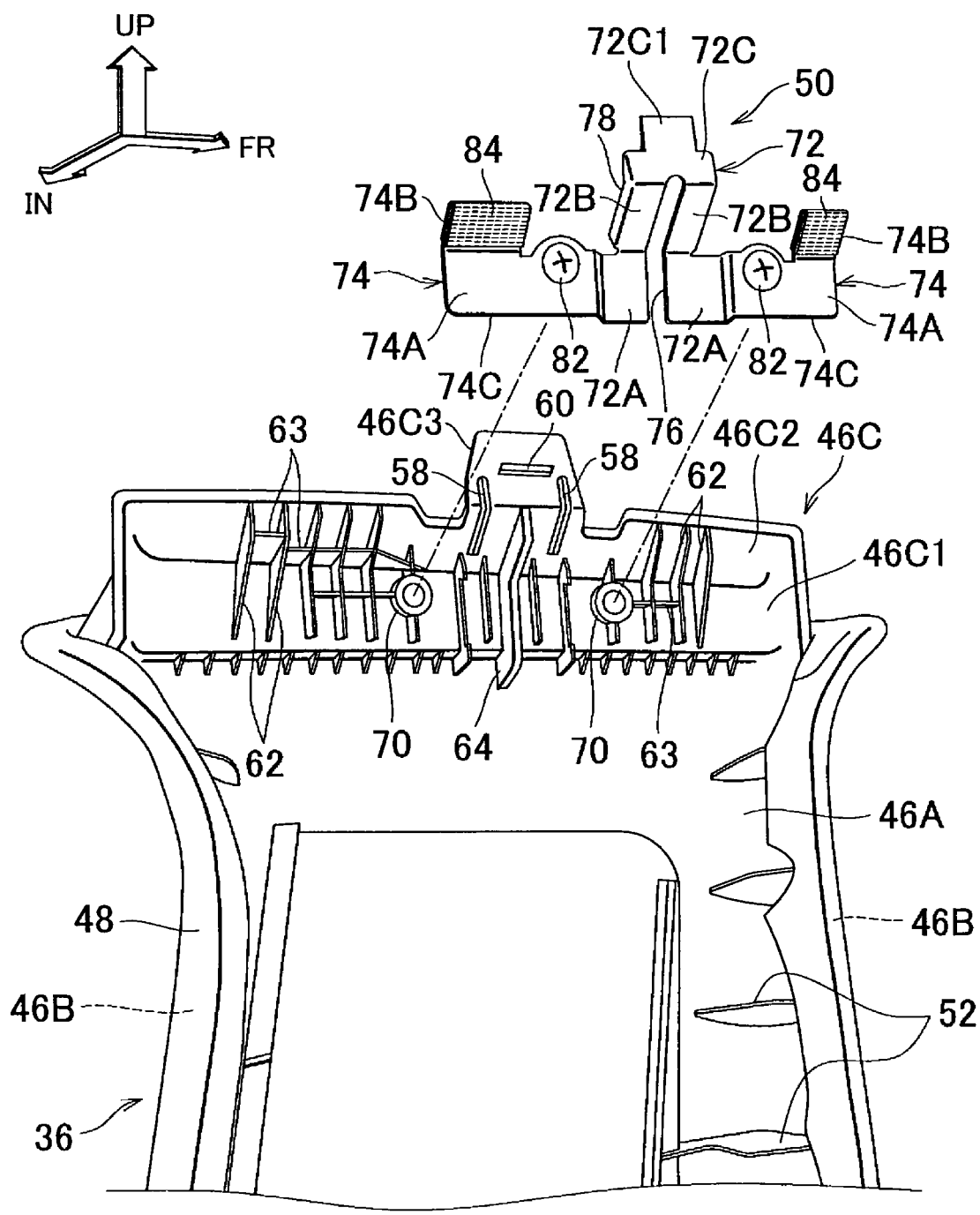
FIG. 7 is an enlarged partial oblique view corresponding to HG 6, showing the condition in which before the bracket is attached to the upper end of the center pillar garnish.

As shown in FIG. 7, a plurality of longitudinal ribs 62 are integrally formed on the outside surface of the upper end 46C with a prescribed spacing, to bridge across the vertical wall 46C1 and the guide wall 46C2. The longitudinal ribs 62 are mutually connected by the plurality of lateral ribs 63 that intersect the longitudinal ribs 62. The longitudinal ribs 62 and the lateral ribs 63 are formed to reinforce the guide wall 46C2.

Additionally, a substantially L-shaped central rib 64 is integrally formed in the center part of the upper end 46C as viewed from the side. The central rib 64 is also integrally formed to bridge across the vertical wall 46C1 and the guide wall 46C2, and is made to have a thickness and a height that are slightly greater than the thickness and height of the longitudinal ribs 62. The central rib 64, similar to the longitudinal ribs 62 and the lateral ribs 63, serves to reinforce the guide wall 46C2. In a vehicle in which a head-protecting air bag apparatus 10 is not installed, however, this is basically provided as a rib to absorb energy when a secondary impact occurs when the head of an occupant strikes the upper end of the center pillar garnish 36 from the passenger compartment.

Figure 5:
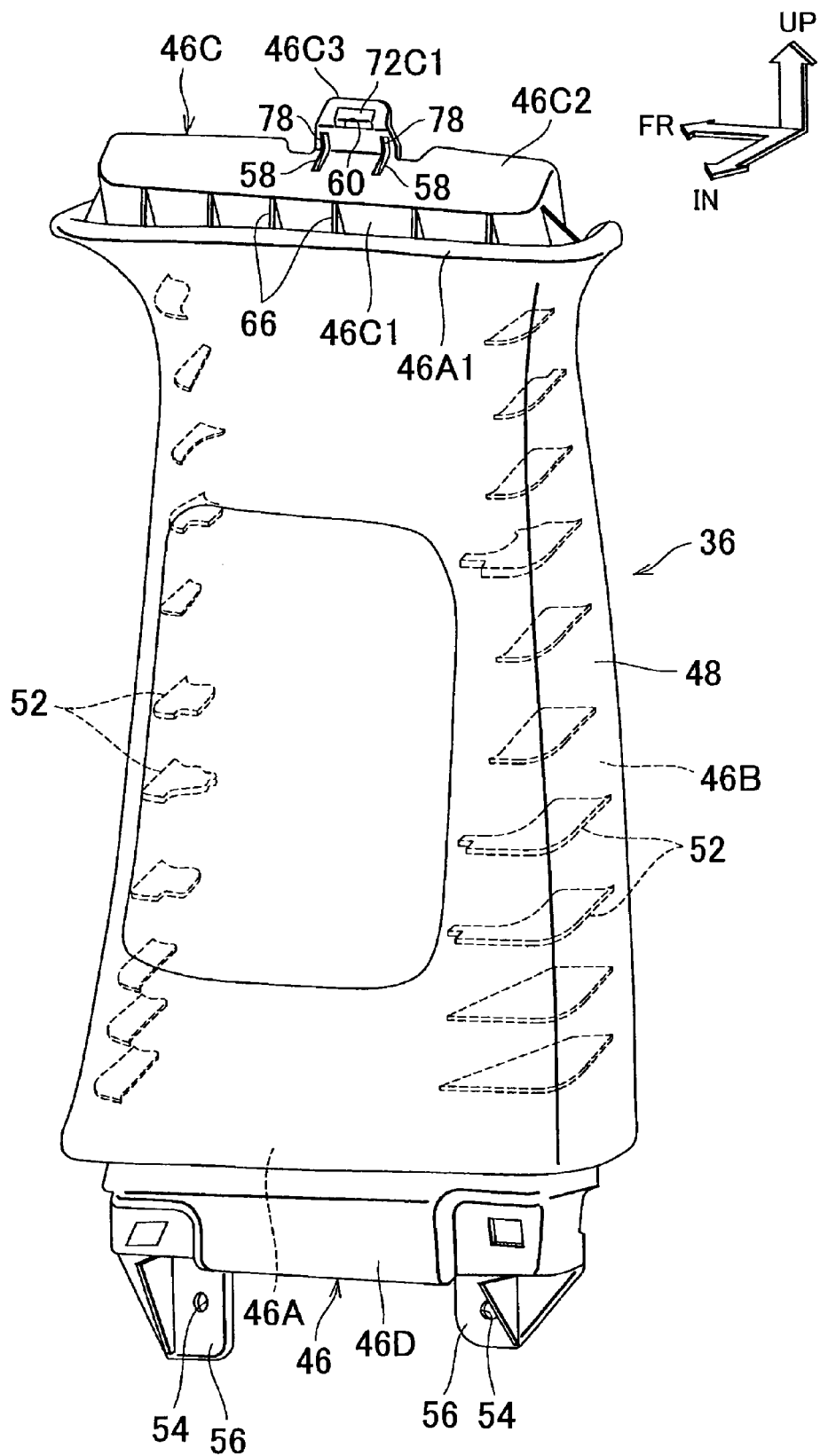
FIG. 5 is an oblique view showing the center pillar garnish to which a bracket is assembled in with the center pillar garnish removed in the embodiment of the present invention.

Additionally, as shown in FIG. 2 and FIG. 5, ribs 66, substantially trapezoidally shaped when viewed from the side, are formed at prescribed intervals on the side of the base part of the upper end 46C that faces the passenger compartment. The long sides (base of the trapezoids) of the longitudinal ribs 66 are connected to the vertical wall 46C1 of the upper end 46C. The short sides (upper side of the trapezoids) of the longitudinal ribs 66 are connected to the upper edge 46A1 (refer to FIG. 2) of the front part 46A. Also, the lower sides of the longitudinal ribs 66 (corresponding to the heights of the trapezoids) connect the upper edge 46A 1 of the front part 46A and the vertical wall 46C1 of the upper end 46C, and are connected to a channel base 68 forming a concave channel therebetween. The longitudinal ribs 66 are provided to prevent the air bag 20 from entering inside the concave channel when the air bag 20 is deployed. The longitudinal ribs 66 correspond to the trapezoidal ribs in the present invention.

As shown in FIG. 7, a pair of bosses 70 on either side of the central rib 64 are formed on the upper edge 46C of the outside surface of base 46. A female thread is formed on the inner peripheral surfaces of the bosses 70.

Figure 8:
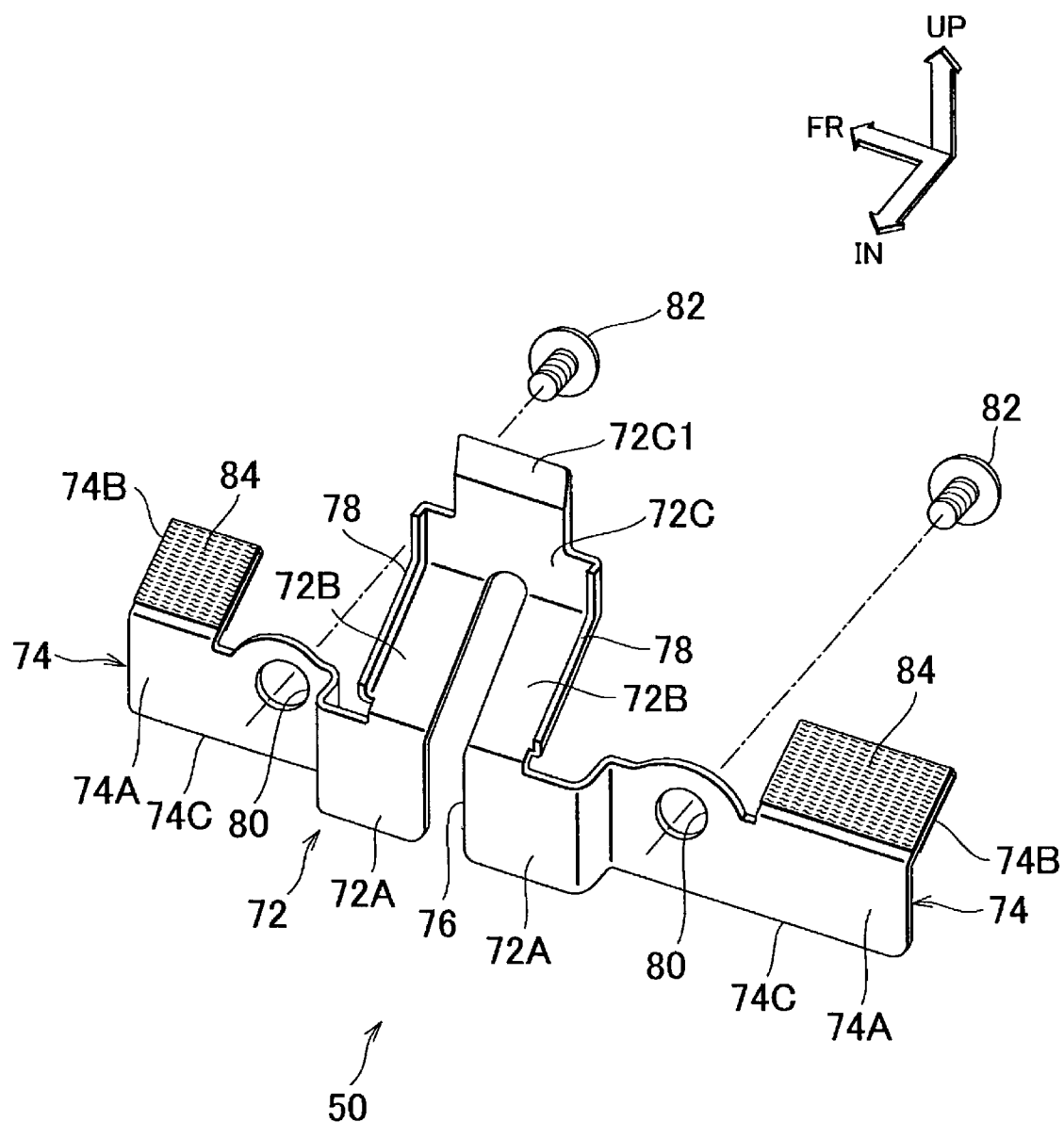
FIG. 8 is an enlarged oblique view showing the bracket of this embodiment alone in the embodiment of the present invention.

The structure of the bracket 50 will now be described. The metal bracket 50 is attached to the surface of the upper end 46C of the base 46 on the outside surface of the center pillar garnish 36. As shown in FIG. 8, the main parts of the bracket 50 are a central support 72 that matches the curvature of the upper end 46C, and a pair of wings 74 that extend outward on the right and left from the bottom edge of the central support 72.

A slit 76 is formed in the central support 72 that extends from the lower edge toward the upper edge in the center part of the central support 72 in the vehicle width direction (the center part in the longitudinal direction of the vehicle when the center pillar garnish 36 is installed in the vehicle). By the formation of this slit 76, the part of the central support 72 from the center part toward the lower part is divided into two parts. More specifically, the central support 72 has a left and right pair of legs 72A disposed at the lower section, a left and right pair of central inclined parts 72B disposed at the central section, and a inclined upper part 72C disposed at the upper section and shaped substantially to appear as a smaller rectangle disposed at the center above a larger rectangle. The slit 76 is formed from the lower edge of the legs 72A of the central support 72 up until a position that is beyond the central inclined parts 72B thereof.

Figure 6:
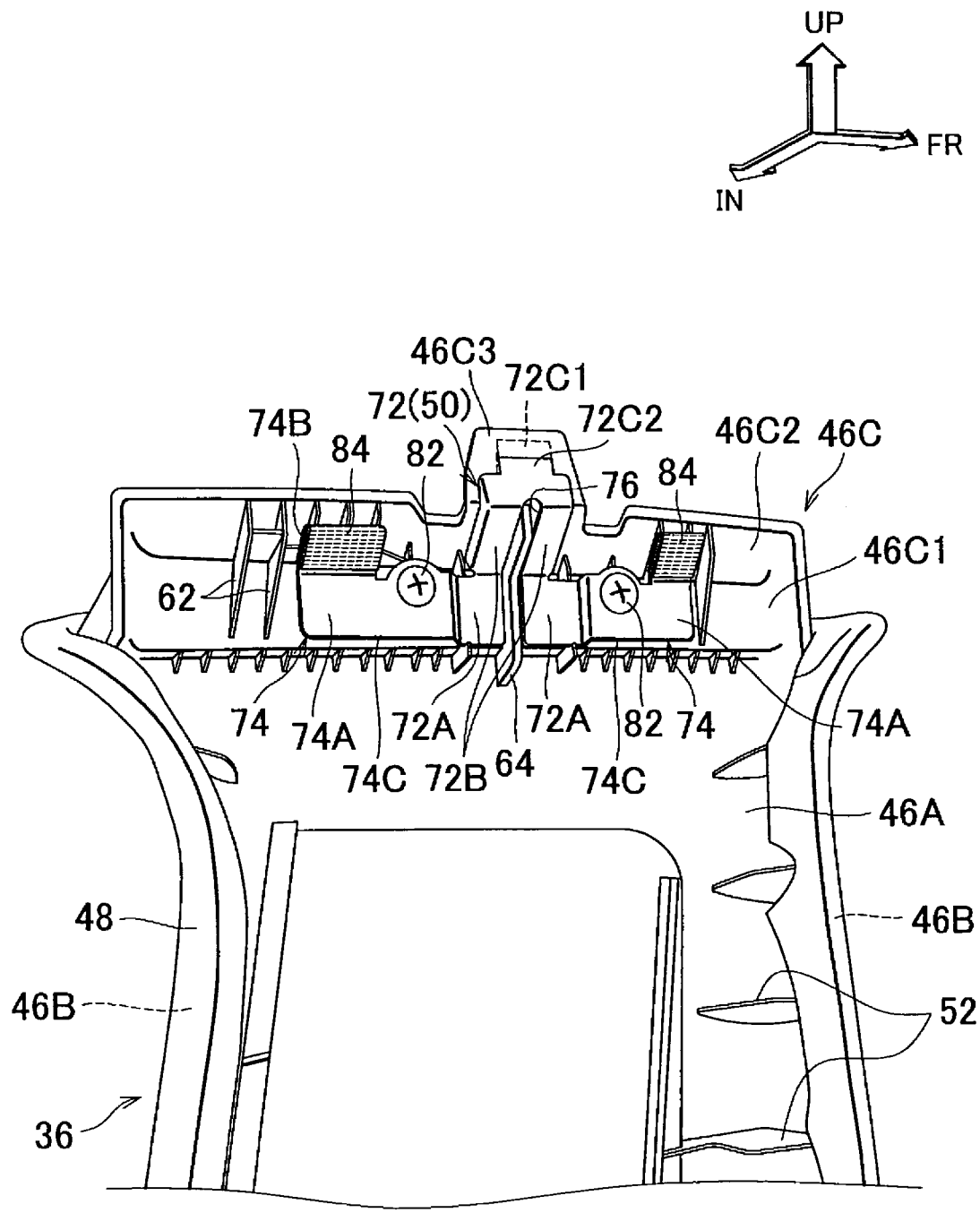
FIG. 6 is an enlarged partial oblique view showing the upper end of the center pillar garnish shown in FIG. 5 as seen from the rear.

As shown in FIG. 6 and FIG. 7, the pair of legs 72A are disposed above and in contact with the longitudinal ribs 62 formed on the outside surface of the vertical wall 46C1 of the base 46. The pair of central inclined parts 72B extends outward at the same angle of inclination as the guide wall 46C2 of the base 46. The central inclined parts 72B are disposed in contact with the lower surface of the guide wall 46C2. Also, the inclined upper part 72C extends outward at the same angle of inclination as the mating part 46C3 of the base 46. The inclined upper part 72C contacts the outside surface of the mating part 46C3. In this condition, the center part 72C1 of the upper inclined part 72C is inserted into the insertion aperture 60 formed in the mating part 46C3 of the base 46. The right and left pair of bent parts 78 formed to be bent on both sides of the lower part of the upper inclined part 72C, and to be bent on both side parts of the central inclined parts 72B, are inserted into the slit 58 of the inclined upper end 46C from below.

The legs 72A are joined to a right and left pair of wings 74 and bend toward the outside in the lateral direction of the vehicle when installed in the vehicle. The pair of wings 74 are disposed above and in contact with the plurality of longitudinal ribs 62 formed on the outside surface of the upper end 46C, and in this condition, screws 82 are inserted into screw insertion holes 80 formed at the base part of the wings 74 to join to the boss 70, thereby fixing the bracket 50 to the outside surface of the upper end 46C.

Folded parts 74B folded from the upper edge of flat parts 74A forming the general surface on each side of each wing 74 are integrally formed on each side of the wings 74. The folded parts 74B are folded and extend from the upper edge of the flat parts 74A at substantially the same angle of inclination as the central inclined parts 72B. Felt 84 for preventing noise is put on the surfaces of the folded parts 74B.

As shown in FIG. 2, the bracket 50 is attached to the upper end 46C. The center pillar garnish 36 is treated as a sub-assembly. After the above, when the sub-assembled center pillar garnish 36 is assembled to the pillar inner panel 38, the mating part 46C3 of the upper end 46C and the center part 72C1 of the upper inclined part 72C of the bracket 50 are joined together, and a condition occurs in which there is substantial opposition of the joined elements with the outside upper edge 86A of an aperture 86 by insertion from below into the aperture 86 formed in the pillar inner panel 38 (causing overlapping disposition that enables mating).

In the above-described assembled condition, as shown in FIG. 1, the folded parts 74B of the wings 74 of the bracket 50 extend upward at an angle of inclination laterally outward, so as to be disposed opposite the seat part 88. The seat part 88 is integrally formed on the pillar inner panel 38 and protrudes toward the guide wall 46C2. Also, as shown in FIG. 3, the lower edges 74C of the wings of the bracket 50 come into contact with the pillar inner panel 38 when the bracket 50 rotates counterclockwise about the base of the upper inclined part 72C as a pivot point. Stated differently, the central support 72 of the bracket 50 not only provides reinforcement so that the excessive deformation of the upper end 46C does not occur, but also should cause undulation of the bracket 50 outward (the direction of arrow Q in FIG. 3) in the lateral direction of the vehicle about the mating point with the pillar inner panel 38 (point P in FIG. 3) and cause the pair of lower edges 74C of the wings 74 to come into contact with the pillar inner panel. That is, the central support 72 may be made to have a shape whereby, by the upper inclined part 72C folding at an obtuse angle with respect to the central inclined parts 72B, the bracket 50 allowed to undulate about the mating point with the pillar inner panel 38, which is a shape that avoids interference in the pillar inner panel 38 with the upper portion of the aperture 86. The upper end 46C has as a main part the guide wall 46C2 that guides (restricts) the deploying direction of the air bag 20 to the direction toward the inside of the passenger compartment.

When the vehicle is subjected to a side impact or a rollover, the condition is detected by the side impact detection sensor or rollover detection sensor and is input to the air bag ECU. When the air bag ECU determines that a side impact or rollover has occurred, the inflator 22 supplies gas to the air bag 20. By doing this, the air bag 20 expands and presses the end part 34A of the headliner 34 into the passenger compartment. When this occurs, because in this embodiment the upper end 46C of the base 46 of the center pillar garnish 36 partially overlaps with the end part 34A of the headliner 34, the upper end 46C is also pressed into the passenger compartment and attempts to deform. However, because the inclined guide wall 46C2, which is inclined downward toward passenger compartment, is formed integrally on the outside surface of the upper end 46C, the air bag 20 is guided by the guide wall 46C2 and the deploying direction thereof is restricted. As a result, the air bag 20 smoothly deploys downward from the roof side rail 18 like a curtain into the passenger compartment, and the heads of the occupants are protected by the expanded front chamber 20A and rear chamber 20B.

In this embodiment, a metal bracket 50 is provided on the outside surface of the guide wall 46C2 of the upper end 46C. When the initial expansion force of the air bag 20 is input to the guide wall 46C2, as can be seen from FIG. 1, first the folded parts 74B of the wings 74 of the metal bracket 50 come into surface contact with the seat part 88 formed on the pillar inner panel 38. As a result, part of the initial expansion force that the guide wall 46C2 and, by extension, the upper end 46C, receives from the air bag 20 is transferred, via the folding parts 74B of the wings 74 of the bracket 50, to the pillar inner panel 38.

Also, as the expansion and deployment of the air bag 20 continues, as shown in FIG. 3, accompanying the end part 34A of the headliner 34 pressing and opening up into the passenger compartment as described above, the upper end 46C also flexes into the passenger compartment by a clearance amount. When this occurs, the base of the mating part 46C3 of the upper end 46C mates with the upper edge outside part 86A of the aperture 86 of the pillar inner panel 38, and the entire bracket 50 is rotated to the outside in the vehicle width direction (the direction of arrow Q in FIG. 3) about the mating point P. As a result, each of the lower edges 74C of the wings of the bracket 50 comes into contact with the pillar inner panel 38, and a part of the expansion force of the air bag 20 from the contacting locations is transferred to the pillar inner panel 38.

In particular, the load that is transferred to the upper end 46C side of the center pillar garnish 36 is therefore commensurately reduced, thereby enabling a reduction of the load applied to the upper end 46C (and particularly to the point of connection between the vertical wall 46C1 and the guide wall 46C2). As a result, this embodiment can effectively reduce the possibility of damage to the upper end 46C, including the guide wall 46C2 that restricts the deploying direction of the air bag 20, which is provided at the upper end of the center pillar garnish 36.

In this embodiment, because the inflator 22 is disposed in the vicinity of the upper end 46C of the center pillar garnish 36 in the roof side rail 18, it can be expected that a larger load will be imparted to the upper end 46C from the high-pressure gas discharged from the inflator 22. However, even if a high load is imparted, because the metal bracket 50 is provided on the vertical wall 46C1 and the guide wall 46C2 that are integrally provided on the upper end 46C, it is possible to efficiently allow the load to escape to the pillar inner panel 38. As a result, this embodiment can effectively prevent damage to the upper end 46C of the center pillar garnish 36 even if the air bag 20 is disposed at the center of the roof side rail 18 or if the output of the inflator 22 is increased.

Although the bracket 50 in the above-described embodiment is made of metal, the bracket 50 may be made from any suitable material, including, but not limited to, a steel plate, an aluminum alloy, or a magnesium alloy.

Although the metal bracket 50 in the above-described embodiment is attached to the upper end 46C of the center pillar garnish 36 using screws, the invention is not limited to this means of attachment. One example of a suitable alternative would be to form an insert in the center pillar garnish.

In the above-described embodiment, the slit 58 is formed in the center part of the bracket 50 and the central rib 64 is inserted into the slit 58. When this is done, the height of the central rib 64 may be made just slightly greater than the flat parts 74A of the wings 74 and the air bag 20 may be made to come into contact with the lower edges 74C of the wings 74 when the air bag 20 expands and deploys. Also, there is no restriction in this manner, and the height of the central rib 64 may be made greater than the position of the flat parts 74A of the wings 74. In this case, first the central rib 64 comes into contact with and breaks by pressure the pillar inner panel 38, after which the lower edges 74C of the wings 74 come into contact with the pillar inner panel 38.

Although the configuration of the above-described embodiment is such that the lower edges 74C of the wings 74 of the bracket 50 come into contact with the pillar inner panel 38, the invention is not limited to this configuration. For example, any part of the wings 74 may come into contact with the pillar inner panel 38. Additionally, a configuration may be adopted in which fasteners such as the screws 82 fixing the bracket 50 to the upper end 46C of the center pillar garnish 36 come into contact with the pillar inner panel 38. That is, in the present invention, in the language "metal bracket, the lower part of which that comes into contact with the pillar inner panel when the expansion force of the air bag is input to the guide wall and the upper edge of the front part of the pillar garnish flexes into the passenger compartment," the "lower part," in addition to including a part forming a part of the bracket 50 at the bottom thereof, such as the wings 74, also includes fasteners and the like set at the lower part of the bracket 50, and a member that while not a part of the bracket 50 exists integrally with the bracket 50 in the assembled condition.

Although in the above-described embodiment, as shown in FIG. 1, the configuration (shape) is such that, when assembled, the wings 74 of the bracket 50 are disposed substantially parallel to the pillar inner panel 38, the invention is not limited to this configuration. For example, the lower edges 74C of the wings 74 in the bracket 50 may be bent in an L-shape toward the pillar inner panel 38, so that the ends of the wings 74 come into contact with the pillar inner panel 38.

Although in the above-described embodiment, the present invention is applied to the center pillar garnish 36, depending upon the type of vehicle, it is possible to apply the present invention to a pillar garnish at other locations as well, and the present invention encompasses such aspects as well.

The invention claimed is:

1. A pillar garnish mounting structure in a vehicle equipped with a head-protecting air bag apparatus, comprising:
   a head-protecting air bag apparatus comprising:
      an inflator, disposed at a prescribed position in the vehicle; and
      an air bag, at least a part of which is housed in a folded condition between a roof side rail and a headliner end part, which expands and deploys from below the roof side rail into a passenger compartment of the vehicle by pressing open the headliner end part when gas is supplied from the inflator;
   a deployment direction guide integrally formed in an outside surface that faces outside of the passenger compartment in the lateral direction of the vehicle at an upper edge of a front part of a pillar garnish, the pillar garnish being affixed to an inside surface that faces the passenger compartment in the lateral direction of the vehicle of a pillar inner panel, wherein at least one part of the front part overlaps with a headliner end part surface inside the passenger compartment, and the deployment direction guide includes a guide wall inclined toward the passenger compartment to guide the deploying direction of the air bag toward the passenger compartment;
   a seat part is formed on the pillar inner panel and protrudes toward the guide wall; and
   a metal bracket is provided on an outside surface of the deployment direction guide, said outside surface facing outside of the passenger compartment in the lateral direction of the vehicle, which comes into surface contact with the seat part when the expansion force of the air bag is applied to the guide wall.

2. The pillar garnish mounting structure according to claim 1, wherein an upper end of the bracket extends both upward and laterally outward, and passes through an aperture formed in the pillar inner panel, and further engages and overlaps with an outside surface that faces outside of the passenger compartment in the lateral direction of the vehicle of the pillar inner panel.

3. The pillar garnish mounting structure according to claim 1, wherein the deployment direction guide further comprises:
   a vertical wall that extends upward to an inside edge of the guide wall and that is substantially parallel with the front part; and
   a mating part that extends upward from an outside edge of the guide wall.

4. The pillar garnish mounting structure according to claim 3, wherein the guide wall extends upward from an upper edge of the vertical wall, and the mating part extends upward from the guide wall such that the mating part is inclined with respect to a horizontal direction at a larger angle than an angle at which the guide wall is inclined with respect to the horizontal direction.

5. The pillar garnish mounting structure according to claim 4, wherein a trapezoidally shaped rib is formed on an inside surface of a base part of the deployment direction guide, said inside surface facing the passenger compartment in the lateral direction of the vehicle, a long side of the trapezoidally shaped rib is connected to the vertical wall, a short side of the trapezoidally shaped rib is connected to the upper edge of the front part wall, and a lower side of the trapezoidally shaped rib is connected to a channel base, which links the upper edge of the front part and the vertical wall.

6. The pillar garnish mounting structure according to claim 4, wherein, on an outside surface of the deployment direction guide, a plurality of longitudinal ribs that bridge across the vertical wall and the guide wall and a lateral rib that intersects with the longitudinal ribs are provided, the lateral rib mutually connecting the plurality of longitudinal ribs.

7. The pillar garnish mounting structure according to claim 6, wherein a central rib that bridges across the vertical wall and the guide wall is provided on a center part of the outside surface of the deployment direction guide in the vehicle width direction, a thickness of the central rib being greater than that of the longitudinal ribs and a height of the central rib towards the outside in the vehicle width direction being higher than that of the longitudinal ribs.

8. The pillar garnish mounting structure according to claim 7, wherein a slit is provided in a center part of the central support of the bracket in the longitudinal direction of the vehicle, the bracket coming into contact with the longitudinal ribs and the mating part, and the central rib being inserted in the slit.

9. The pillar garnish mounting structure according to claim 1, wherein the bracket includes a central support bent to coincide with the shape of the deployment direction guide, and a pair of wings that extend outward on the right and left from a bottom edge of the central support.

10. The pillar garnish mounting structure according to claim 9, wherein when the upper edge of the front part flexes into the passenger compartment when the expansion force of the air bag is applied to the guide wall, the lower edges of the wings come into contact with the pillar inner panel.

11. The pillar garnish mounting structure according to claim 9, further having a sound-absorbing material on an upper end of the wings.

12. The pillar garnish mounting structure according to claim 1, wherein the air bag has a front chamber that expands at the side of the head of a front-seat occupant, and a rear chamber that expands at the side of the head of a rear-seat occupant, wherein
   the inflator is disposed near the deployment direction guide in the roof side rail.

13. A pillar garnish mounting structure in a vehicle equipped with a head-protecting air bag apparatus, comprising:
   a head-protecting air bag apparatus comprising:
      an inflator, disposed at a prescribed position in the vehicle; and
      an air bag, at least a part of which is housed in a folded condition between a roof side rail and a headliner end part, which expands and deploys from below the roof side rail into a passenger compartment of the vehicle by pressing the headliner end part to open;

a deployment direction guide integrally formed in an outside surface that faces outside of the passenger compartment in the lateral direction of the vehicle at an upper edge of a front part of a pillar garnish, the pillar garnish being affixed to an inside surface that faces the passenger compartment in the lateral direction of the vehicle of a pillar inner panel, wherein at least one part of the front part overlaps with a headliner end part surface inside the passenger compartment, and the deployment direction guide includes a guide wall inclined toward the passenger compartment to guide the deploying direction of the air bag toward the passenger compartment; and a metal bracket provided on an outside surface that faces outside of the passenger compartment in the lateral direction of the vehicle of the deployment direction guide, a lower part of which comes into contact with the pillar inner panel when an expansion force of the air bag is applied to the guide wall and the upper edge of the front part of the pillar garnish flexes into the passenger compartment, and wherein an upper end of the bracket extends both upward and laterally outward, and passes through an aperture formed in the pillar inner panel, and further engages and overlaps with an outside surface that faces outside of the passenger compartment in the lateral direction of the vehicle of the pillar inner panel.

14. The pillar garnish mounting structure according to claim 13, wherein the deployment direction guide further comprises:

a vertical wall that extends upward to an inside edge of the guide wall and that is substantially parallel with the front part; and a mating part that extends upward from an outside edge of the guide wall.

15. The pillar garnish mounting structure according to claim 14, wherein the guide wall extends upward from an upper edge of the vertical wall, and the mating part extends upward from the guide wall such that the mating part is inclined with respect to a horizontal direction at a larger angle than an angle at which the guide wall is inclined with respect to the horizontal direction.

16. The pillar garnish mounting structure according to claim 15, wherein a trapezoidally shaped rib is formed on an inside surface of a base part of the deployment direction guide, said inside surface facing the passenger compartment in the lateral direction of the vehicle, a long side of the trapezoidally shaped rib is connected to the vertical wall, a short side of the trapezoidally shaped rib is connected to the upper edge of the front part wall, and a lower side of which the trapezoidally shaped rib is connected to a channel base, which links the upper edge of the front part and the vertical wall.

17. The pillar garnish mounting structure according to claim 15, wherein, on an outside surface of the deployment direction guide, a plurality of longitudinal ribs that bridge across the vertical wall and the guide wall and a lateral rib that intersects with the longitudinal ribs are provided, the lateral rib mutually connecting the plurality of longitudinal ribs.

18. The pillar garnish mounting structure according to claim 17, wherein a central rib that bridges across the vertical wall and the guide wall is provided on a center part of the outside surface of the deployment direction guide in the vehicle width direction, a thickness of the central rib being greater than that of the longitudinal ribs and a height of the central rib towards the outside in the vehicle width direction being higher than that of the longitudinal ribs.

19. The pillar garnish mounting structure according to claim 18, wherein a slit is provided in a center part of the central support of the bracket in the longitudinal direction of the vehicle, the bracket coming into contact with the longitudinal ribs and the mating part, and the central rib being inserted in the slit.

20. The pillar garnish mounting structure according to claim 13, wherein the bracket includes a central support bent to coincide with the shape of the deployment direction guide, and a pair of wings that extend outward on the right and left from a bottom edge of the central support.

21. The pillar garnish mounting structure according to claim 20, wherein when the upper edge of the front part flexes into the passenger compartment when the expansion force of the air bag is applied to the guide wall, the lower edges of the wings come into contact with the pillar inner panel.

22. The pillar garnish mounting structure according to claim 20, further having a sound-absorbing material on an upper end of the wings.

23. The pillar garnish mounting structure according to claim 13, the inflator is disposed near the deployment direction guide in the roof side rail.

* * * * *